United States Patent [19]

Mackensen

[11] Patent Number: 4,473,063
[45] Date of Patent: Sep. 25, 1984

[54] SOLAR HEATER

[76] Inventor: Warren J. Mackensen, 31 Forest St., Hampton, N.H. 03842

[21] Appl. No.: 410,011

[22] Filed: Aug. 20, 1982

[51] Int. Cl.³ .............................................. F24J 3/02
[52] U.S. Cl. .................................... 126/422; 126/419
[58] Field of Search ............................... 126/419, 422

[56] References Cited

U.S. PATENT DOCUMENTS

| | | |
|---|---|---|
| 3,931,806 | 1/1976 | Hayes . |
| 4,010,734 | 3/1977 | Chayet . |
| 4,034,738 | 7/1977 | Barber .............................. 126/422 |
| 4,064,867 | 12/1977 | Schlesinger . |
| 4,126,122 | 11/1978 | Bross . |
| 4,191,172 | 3/1980 | Walch, Jr. . |
| 4,212,287 | 7/1980 | Dougherty et al. ............... 126/419 |

Primary Examiner—Carroll B. Dority, Jr.
Attorney, Agent, or Firm—Blodgett & Blodgett

[57] ABSTRACT

Solar heater having a collector wherein heat transfer fluid is heated by solar radiation and a heat-dissipating conduit operatively connected to the collector so that fluid from a return line normally flows through the collector and the heat-dissipating conduit. Flow control means are operatively connected to the collector and the heat-dissipating conduit so that at times the heat transfer fluid flows through the heat-dissipating conduit, the amount of said fluid flow increasing with an increase in temperature of said fluid and decreasing with a decrease in temperature of said fluid.

6 Claims, 2 Drawing Figures

SOLAR HEATER

BACKGROUND OF THE INVENTION

Because of rapidly escalating energy costs, there has been a steady increase in the use of solar collectors for the purpose of preheating water for domestic and industrial purposes. Numerous preheating systems, which vary in the degree of complexity and practicality, have been proposed. In many of the systems, a heat transfer fluid is circulated through a series of solar collectors in which it is heated by solar energy. The heat transfer fluid is then circulated through a heat exchange system in which the energy from the heat transfer fluid is delivered to a load such as water. The heated water is then used directly, stored for later use, or heated an additional amount by auxiliary heating means.

Most solar heating systems are designed for maximum efficiency, so that they will be relatively effective during most of the daylight hours in all seasons, even in colder climates. Most solar heating systems have provisions for storing the thermal energy during the peak energy gathering periods, so that the energy can be used during periods where little energy is collected. However, since solar systems are geared to function during non-peak periods, excessive heating of the heat transfer fluid sometimes occurs during the peak periods which tends to create problems in the solar system. Excessive heat prevents the use of some materials which might otherwise be used in the solar collectors, because of desirable qualities such as thermo-insulation, lightweight, and cost. The principal disadvantage of excessive heat is the effect that the heat has on the heat transfer fluid itself. Many materials commonly used as heat transfer fluids break down at high temperatures. For example, many types of antifreeze solutions break down at high temperatures and lose their chemical stability. This causes chemical corrosion of many of the components in the entire system. The deterioration of the components comprising a solar collector is also exacerbated by unnecessary exposure to high temperature. Also, replacement of these transfer fluids is expensive. These and other difficulties experienced with the prior art devices have been obviated in a novel manner by the present invention.

One of the most serious problems encountered in solar heater systems is "stagnation". "Stagnation" is defined as a condition in which there is no fluid flow in the system. Some of the causes of stagnation are:
1. a mechanical or electrical failure in the pump,
2. accidental shutting of a valve in the system,
3. failure of a thermo sensor in the system,
4. failure of an automatic control element,
5. shutdown of the solar loop because of a fully charged situation at the heat exchanger or load.

Stagnation may occur for one or more of the above reasons even if the sun is shining. When this occurs, the heat transfer fluid heats up quickly in the collectors beyond the chemical stability of the fluid. The system must then be drained and the fluid replaced. Also, there is some corrosive damage in the system if the condition is not discovered quickly.

It is, therefore, an outstanding object of the invention to provide a solar heater which is provided with a temperature control means for the heat transfer fluid which prevents overheating of the fluid.

Another object of this invention is the provision of a solar heater in which the temperature of the heat transfer fluid is maintained below a preset value at the point where it is utilized for heat exchange with a liquid load.

A further object of the present invention is the provision of a solar heater in which the heat transfer fluid is automatically cooled when it has reached a preset temperature.

It is another object of the instant invention to provide a solar heater in which the flow of the heat transfer fluid through the system is precisely controlled.

Another object of the present invention is to limit the temperature achieved in the solar collectors through the use of the heat-dissipating conduit in a thermosiphoning mode.

A further object of the invention is the provision of a solar heater in which stagnation is prevented.

A still further object of the invention is the provision of a solar heater in which the rate of cooling of the heat transfer fluid is precisely controlled.

It is a further object of the invention to provide a solar heater in which the entire solar heating system is balanced with respect to the flow and temperature of the heat transfer fluid to provide a steady and predictable heat exchange condition at the point where heat is transferred from the heat transfer fluid to the liquid load.

It is still a further object of the present invention to provide a solar heater which is simple in construction, and which is capable of a long life of useful service with a minimum of maintenance.

With these and other objects in view, as will be apparent to those skilled in the art, the invention resides in the combination of parts set forth in the specification and covered by the claims appended hereto.

SUMMARY OF THE INVENTION

In general, the invention consists of a solar heater comprising a collector having an inlet at one end, and outlet at the other end and a passage extending from the inlet to the outlet. Heat transfer fluid from a return line flows through the passage from the inlet of the collector to the outlet of the collector and absorbs solar energy during the passage. A heat-dissipating conduit having an inlet and an outlet is operatively connected to the collector so that fluid from the return line normally flows through the collector and the heat-dissipating conduit.

A temperature responsive valve controls the relative flow of fluid through the collector and the heat-dissipating conduit so that an increase in fluid temperature causes more fluid to flow through the heat-dissipating conduit and a decrease in fluid temperature causes more fluid to flow through the collector.

More specifically, the heat-dissipating conduit is located above and is parallel with the collector, so that thermosiphoning takes place from the collector to the heat-dissipating conduit when stagnation occurs.

BRIEF DESCRIPTION OF THE DRAWINGS

The character of the invention, however may be best understood by reference to one of its structural forms, as illustrated by the accompanying drawings, in which.

DETAILED DESCRIPTION OF THE PREFERRED EMBODIMENT

Figure 1:
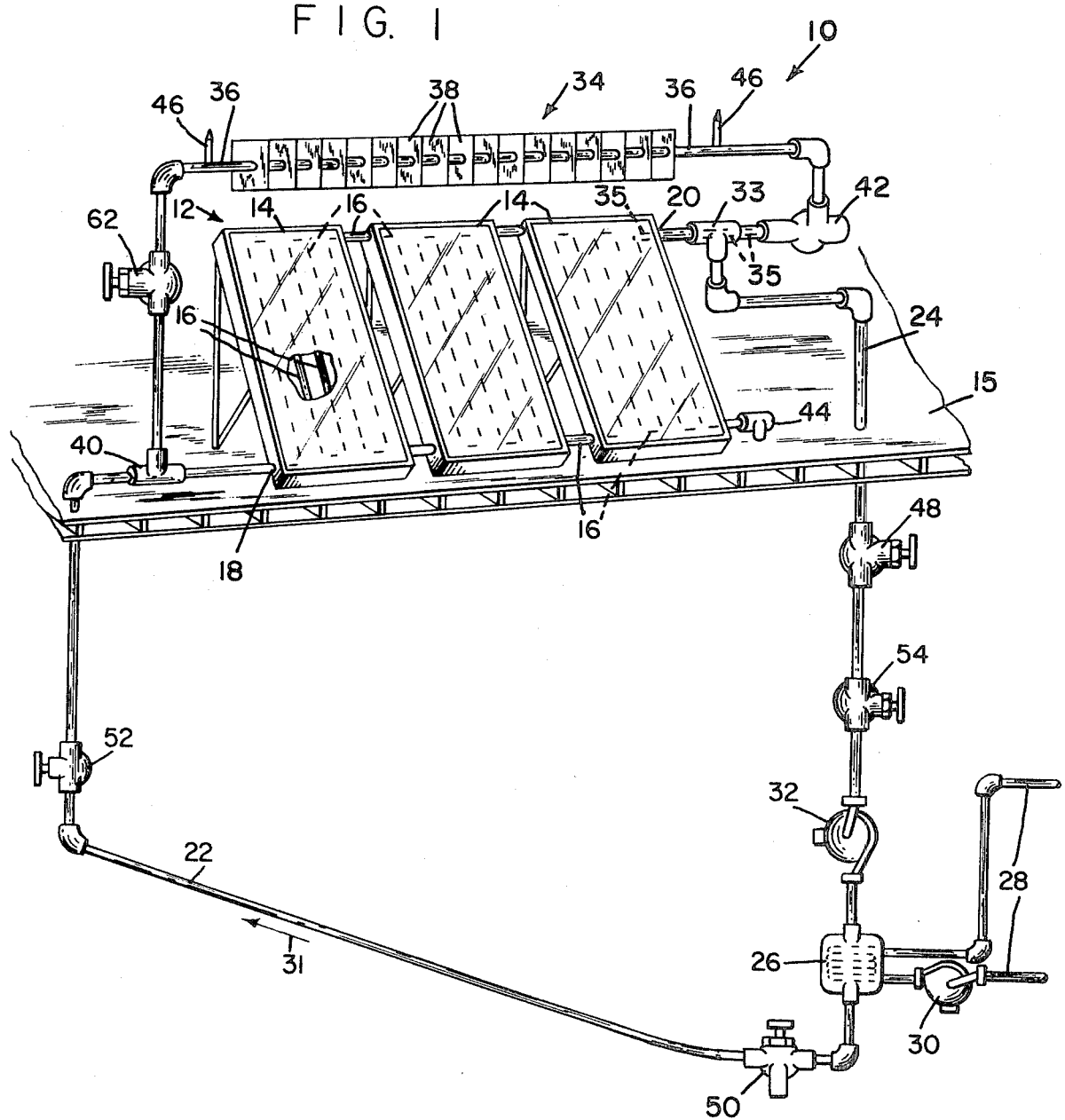
FIG. 1 is a perspective schematic view of a solar heater embodying the principles of the present invention.

Referring to FIG. 1, the solar heater of the present invention is generally indicated by the reference numeral 10 and includes a solar collector array generally indicated by the reference numeral 12. The collector array 12 comprises a plurality of flat solar panels 14 arranged in series or parallel on a roof or other external structure 15 and facing in a generally southerly direction. A passage in the form of a conduit 16 extends through the interiors of the solar panels 14 from an inlet 18 to an outlet 20. The inlet 18 is connected to a return line 22 and the outlet 20 is operatively connected to a supply line 24. The return line 22 and the supply line 24 both lead to a heat exchanger 26. Load fluid pipes 28 are also connected to the heat exchanger 26. However, the load fluid and the heat transfer fluid are in separate systems so that the load fluid and the heat transfer fluid do not mix. The load pipes 28 are also connected to elements, not shown, which comprise the load, such as a hot water heating tank or a thermal energy storage tank. For example, a conventional hot water tank could be used with the heat exchanger 26. In such a system, water is circulated through the heat exchanger 26, so that it flows from and to the pipes 28 and the hot water elements by means of a pump 30.

The return line 22, the supply line 24, and the conduit 16 form a closed loop system containing a heat transfer fluid which may be of any conventional type but a mixture of water and antifreeze is preferred. Heat transfer fluid is circulated in the closed loop by means of a pump 32 in the supply line 24, so that the fluid flows in the direction of arrow 31. The pump 32 may also be located on the return line 22, if desired. The heat transfer fluid flows into the conduit 16 of the panels 14 from the inlet 18, is heated by solar radiation, and then through a junction such as a T fitting 33 into the supply line 24 from outlet 20. It then passes through the heat exchanger 26, wherein energy from the heat transfer fluid is transferred to the liquid load being circulated through the heat exchanger by the pump 30.

The solar heater 10 also comprises a heat-dissipating conduit located above the panels 14. The heat-dissipating conduit is generally indicated by the reference numeral 34, and consists of a pipe 36 provided with heat-dissipating fins 38. One end of the pipe 36 is connected by a junction such as a T fitting 40 close to the inlet 18. The opposite end of the pipe 36 is connected to the thermo-actuated valve 42. The valve 42 is also connected to the T fitting 33. The valve 42 includes a temperature sensing probe 35 which extends through the T fitting 33, through the outlet 20 and into the last panel 14. The probe 35 responds to the temperature of the heat transfer fluid in the panel 14 and is effective to open or close the valve 42, depending on the temperature of the fluid. When the heat transfer fluid is cold, the valve 42 is closed by the probe 35 and the heat transfer fluid flows only through the conduit 16 of the panels 14 to the supply line 24. When the heat transfer fluid is hot, the valve 42 is opened by the probe 35 and the heat transfer fluid flows through the conduit 16 and the conduit 36 to the T 33 and then into the supply line 24. The valve 42 is fully open at a maximum preset heat transfer fluid temperature and fully closed at a minimum preset heat transfer fluid temperature. When the valve 42 is fully open, there is a maximum flow through the conduit 34 and, consequently, maximum cooling of the fluid. When the valve 42 is fully closed there is no flow through the conduit 34 and, consequently, no cooling of the fluid. Fluid temperatures between the maximum and minimum temperatures of the heat transfer fluid will cause the valve 42 to be partially open, the extent of opening varying proportionately with the sensed temperature of the fluid.

A variable resistance valve 62 is located at the end of the heat-dissipating conduit 34 which is adjacent the return line 22. The resistance of the valve 62 is adjustable so that the amount of fluid flow through the conduit 34 relative to the conduit 16 when the valve 42 is fully open can be set to a desired optimum value for each specific application of the invention. The collector array 12 has an inherent high flow resistance compared to the heat-dissipating conduit 34. Accordingly, the flow through the collector array 12 exhibits a high pressure drop compared to the heat-dissipating conduit 34. This difference in flow resistance and resulting pressure drop is compensated for by the variable resistance valve 62.

The lower portion of conduit 16 is provided with a pressure-relief valve 44 which opens when a predetermined pressure is reached within the conduit. Air vents 46 are located at opposite ends of the heat-dissipating conduit 34. A balancing valve 48 is located on the supply line 24. Valve 48 is used to adjust the rate of flow of the heat transfer fluid through the system. A drain valve 50 is located on the return line 22 for draining fluid from the system. Shutoff valves 52 and 54 are located on lines 22 and 24, respectively.

The operations and advantages of the present invention will now be readily understood in view of the above description. At the beginning of operation, the valve 42 is closed and the pump 32 circulates the heat transfer fluid through the system in the direction of arrow 31. The balancing valve 48 is adjusted to provide a predetermined rate of flow of the fluid. The cool heat transfer fluid enters the conduit 16 of the collector 14 from the inlet 18. As the fluid advances through the collectors panels 14, it is heated by solar radiation. The heated heat transfer fluid exits through the collector outlet 20 into the T 33 and into the supply line 24. If the temperature of the heat transfer fluid which is sensed by the probe 35 is below a preset temperature, the valve 42 remains closed and there is no flow through the heat-dissipating conduit 34. The pump 30 circulates the liquid load water through the heat exchanger 26 wherein thermal energy from the heat transfer fluid is absorbed by the liquid load.

If the temperature of the heat transfer fluid sensed by the probe 35 is above a preset temperature, the valve 42 opens and some of the heat transfer fluid from the return line 22 is directed into the heat-dissipating conduit 34. As the heat transfer fluid passes along the length of the heat-dissipating conduit 34, it is cooled and enters the T fitting 33 where it mixes with fluid from the collector array 12. In the preferred embodiment, the valve 42 operates within a low preset temperature and a high preset temperature. If the temperature of the heat transfer fluid is below that of the low preset temperature, all of the heat transfer fluid flows through the conduit 16 of the collector. When the temperature of the heat transfer fluid is above the high preset temperature, some of the fluid from the return line 22 is directed through the conduit 36. There is a continuous throttling range between the high and low preset temperatures during which flow of fluid through the conduit 36 varies proportionately with the temperature of the fluid. More fluid flows through conduit 36 when the temperature is close to the high preset temperature and less fluid flows through the conduit 34 when the temperature of the fluid is close to the low preset temperature. This ensures that the temperature of the heat transfer fluid at the heat exchanger 26 will be relatively constant. Since the heat transfer fluid flows through the heat exchanger at a constant temperature and at a constant rate, the system provides a uniform and predictable heat exchange condition within the heat exchanger. The system provides uniform, even transfer conditions throughout the daylight hours and for all seasons. Wide flunctuations in thermal energy at the transfer point are avoided, so that the entire heating system can operate smoothly and efficiently.

There are times when pump 32 should be running to cool the solar collectors (because the sun is out) but for various reasons no flow occurs through the solar collectors 14. This condition is known as stagnation. The pump may not be running because of a high-limit cutout, a loss of power to the pump, a pump controller failure, a pump failure of a mechanical or electrical nature, or any of a number of possible failure modes. In any case, a collector stagnation condition is deemed to exist whenever the sun is out and no-flow condition exists in the solar collectors. Antifreeze deterioration and collector damage occur as a result of the stagnation condition.

When stagnation occurs, the fluid in the panels 14 is heated to the high preset temperature. This temperature is sensed by the probe 35 which causes the valve 42 to open, thereby establishing a flow path between the solar collectors 14 and the heat-dissipating conduit 34. Since the heat-dissipating conduit 34 is physically above the solar collectors, a thermal driving head is established to induce thermosiphoning. Thermosiphoning is defined as a flow of fluid resulting strictly from a density difference caused by a temperature difference in the two vertical legs of a closed loop flow path. For purposes of this invention, the cold leg with the denser fluid exists in the vertical (or inclined) pipe in which valve 62 is located. The hot leg, so called, comprises all of the vertical or inclined passageways within the solar collector panel 14.

The denser fluid in the cold leg falls relative to the lighter fluid in the solar collector panels, thereby creating a flow through the heat-dissipating conduit 34. As fluid flows through the heat-dissipating conduit 34, the fluid cools and becomes more dense. As the fluid flows through the collector panels 14, the fluid heats up and becomes less dense. As a result, the thermosiphoning process continues until either the sun sets or power is restored. One of the major advantages of the system is that thermosiphoning occurs automatically and requires no electrical power to either initiate or effect the thermosiphoning.

If power is restored during an on-going thermosiphoning condition, flow through the heat-dissipating conduit 34 will be instantly reversed by the pumping action. The thermally activated element in valve 42 will shut very shortly, assuming there is sufficient load on the system. If the overtemperature condition persists such that the preset temperature continues to be exceeded, a parallel flow condition will be established whereby heat transfer fluid from return pipe 22 will split at fitting 40, a portion of which will flow through pipe 18 and into the solar collector inlet, and the balance will flow through variable resistance valve 62 and through the heat-dissipating conduit 34.

Figure 2:
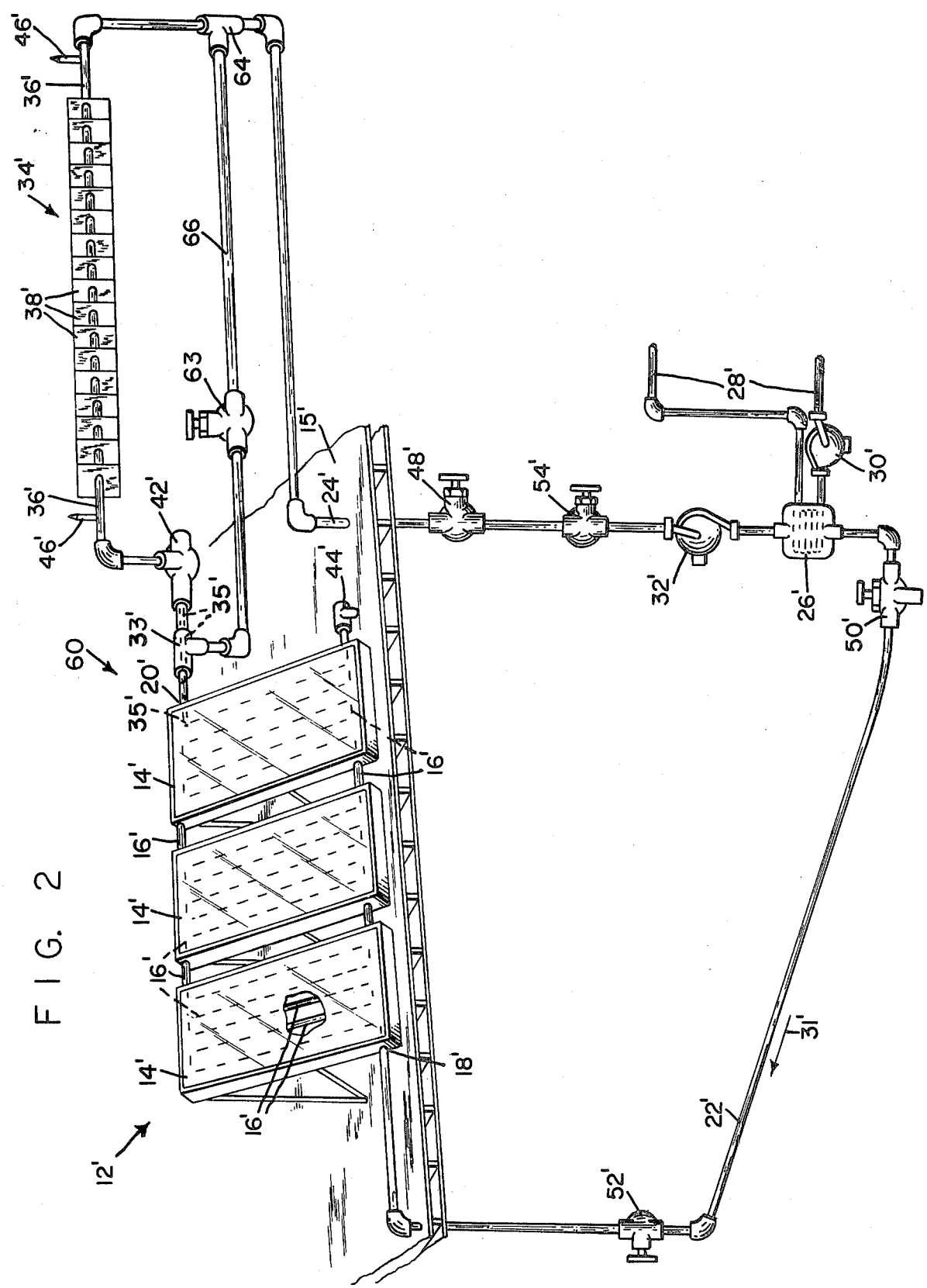
FIG. 2 is a view similar to FIG. 1 showing a modified form of the invention.

Referring to FIG. 2, there is shown a modified solar heater, generally indicated by the reference numeral 60 and all comparable portions are identified with the same reference numerals, except that the numerals in FIG. 2 are differentiated by the use of a prime. The main difference between the systems shown in FIG. 1 and FIG. 2 is the manner in which the heat-dissipating conduit is connected to the supply and return lines. Further, the heat-dissipating conduit does not have to be physically mounted above the collector array 12'.

Referring to FIG. 2, the outlet end of the heat-dissipating conduit 34' is connected to a first junction such as a T fitting 64. The T fitting 64 is also connected to the return line 24'. Thermo activated valve 42' is connected to the inlet end of the conduit 34' and to T fitting 33' which constitutes a second junction. The T fitting 33' is connected to the outlet 20' of the collector conduit 16' and to the T fitting 64 by a connecting line 66. A balancing valve 63 is located in the connecting line 66.

The valve 42' includes a probe 35' which extends through the fitting 33' and the outlet 20' into the last collector panel 14' for sensing the temperature of the heat transfer fluid within the panel.

When the probe 35' senses a fluid temperature which is at or below a low preset temperature, the valve 42' is closed and all of the heat transfer fluid from the outlet 20' flows through the connecting line 66 to the T fitting 64 and to the supply 24'. When the temperature of the heat transfer fluid which is sensed by the probe 35' is at or above a high preset temperature, the valve 42' is opened and the fluid from outlet 20' flows through the conduit 34' and the connecting line 66 to the T fitting 64. The relatively hot fluid from line 66 and the relatively cool fluid from conduit 34' combine in the fitting 64. The combined fluid flow then continues to the supply line 24'. As in the preferred embodiment, there is a throttling range of the valve 42' between the low preset temperature and the high preset temperature. The balancing valve 63 is adjusted to provide a desired optmum relative flow ratio between the line 66 and the conduit 34' for the open position of the valve 42'.

The embodiment shown in FIG. 2 will not provide thermosiphoning for a stagnation condition.

The embodiment in FIG. 2 does not necessarily require the use of a temperature-responsive valve with a probe that extends into the collector outlet 20'. The thermo activated valve 42' may be one utilizing an internal or an external sensing element.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Solar heater, comprising:
   (a) a collector for receiving solar radiation, said collector having an inlet for receiving a heat transfer fluid, an outlet for discharging heat transfer fluid and a passage from the inlet to the outlet, wherein said heat transfer fluid is heated by solar radiation,
   (b) a return line connected to the inlet for providing a heat transfer fluid to the collector, (c) a supply line connected to the outlet for receiving heated heat transfer fluid from the collector and conveying it to an end use, (d) a heat-dissipating conduit having an inlet and an outlet, wherein the collector and the heat-dissipating conduit are connected in parallel and the inlets of the collector and heat-dissipating conduit are connected to the return line so that fluid from the return line normally flows through the collector and the heat-dissipating conduit, and (e) flow control means comprising a junction connected to the outlet of the heat-dissipating conduit, to the outlet of the collector and to the supply line and a temperature responsive valve between the outlet of the heat-dissipating conduit and the junction, said temperature responsive valve having a temperature responsive probe extending from the valve through the junction and into the collector for sensing the temperature of the heat transfer fluid and for causing the valve to open and close in accordance with the sensed temperature of the heat transfer fluid so that at least some of the heat transfer fluid from the return line flows through the collector and on occasion some of the fluid flows through the heat-dissipating conduit, the amount of said fluid flowing through the heat-dissipating conduit increasing with an increase in temperature of said fluid and decreasing with a decrease in the temperature of said fluid.

2. Solar heater, comprising:
(a) a collector for receiving solar radiation, said collector having an inlet for receiving a heat transfer fluid, an outlet for discharging heat transfer fluid and a passage from the inlet to the outlet, wherein said heat transfer fluid is heated by the solar radiation, (b) a return line connected to the inlet for providing a heat transfer fluid to the collector, (c) a supply line connected to the outlet for receiving heated heat transfer fluid from the collector and conveying it to an end use, (d) a heat-dissipating conduit having an inlet and an outlet, wherein the collector and the heat-dissipating conduit are connected in parallel and the inlets of the collector and heat-dissipating conduit are connected to the return line, so that fluid from the return line normally flows through the collector and the heat-dissipating conduit, (e) flow control means comprising a junction connected to the outlet of the heat-dissipating conduit, to the outlet of the collector and to the supply line and a temperature responsive valve between the outlet of the heat-dissipating conduit and the junction, said temperature responsive valve having a temperature responsive probe for sensing the temperature of the heat transfer fluid and for causing the valve to open and close in accordance with the sensed temperature of the heat transfer fluid, so that at least some of the heat transfer fluid from the return line flows through the collector and on occasion some of the fluid flows through the heat-dissipating conduit, the amount of said fluid flowing through the heat-dissipating conduit increasing with an increase in temperature of said fluid and decreasing with a decrease in the temperature of said fluid, and (f) a variable resistance valve located betwen the inlet of the heat-dissipating conduit and the return line.

3. Solar heater as recited in claim 2, wherein the heat-dissipating conduit is located above the collector, so that upon the occurrence of a stagnation condition in which flow from the return line and flow to the supply line is halted, thermosiphoning occurs in a loop which includes the heat-dissipating conduit and the collector and in which the fluid in said loop flows from the outlet of the collector to the outlet of the heat-dissipating conduit, from the inlet of the heat-dissipating conduit to the inlet of the collector, through the collector and back to the outlet of the collector.

4. Solar collector as recited in claim 2, wherein the heat-dissipating conduit comprises a pipe with heat-dissipating fins extending from the exterior of the pipe.

5. Solar heater, comprising:
(a) a collector for receiving solar radiation, said collector having an inlet for receiving a heat transfer fluid, an outlet for discharging heat transfer fluid and a passage from the inlet to the outlet, wherein said heat transfer fluid is heated by the solar radiation, (b) a return line connected to the inlet for providing a heat transfer fluid to the collector, (c) a supply line connected to the outlet for receiving heated heat transfer fluid from the collector and conveying it to an end use, (d) a heat-dissipating conduit having an inlet and an outlet and is operatively connected to the collector so that fluid from the return line normally flows through the collector and the heat-dissipating conduit, and (e) flow control means comprising a first junction connected to the outlet of the heat-dissipating conduit and to the supply line, a second junction connected to the outlet of the collector, to the inlet of the heat-dissipating conduit and to the first junction, and a temperature responsive valve between the inlet of the heat-dissipating conduit and the second junction, said temperature responsive valve having a temperature responsive probe which extends from the valve through the junction and into the collector for sensing the temperature of the heat transfer fluid and for causing the valve to open and close in accordance with the sensed temperature of the heat transfer fluid, so that at least some of the heat transfer fluid flows through the collector and on occasion some of the fluid flows through the heat-dissipating conduit, the amount of said fluid flowing through the heat-dissipating conduit increasing with an increase in temperature of said fluid and decreasing with a decrease in the temperature of said fluid.

6. Solar heater as recited in claim 5, wherein said first junction is connected to said second junction by a connecting line, and wherein a balancing valve is located in said connecting line.

* * * * *